(No Model.) 5 Sheets—Sheet 1.
A. J. LYON.
APPARATUS AND TILL FOR RECORDING AND REGISTERING THE AMOUNT OF MONEY RECEIVED.
No. 389,159. Patented Sept. 4, 1888.
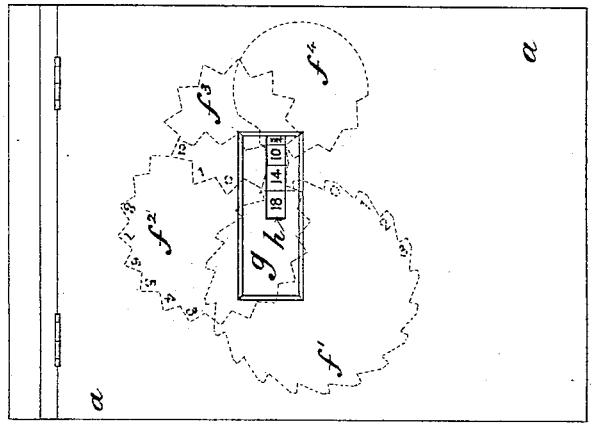
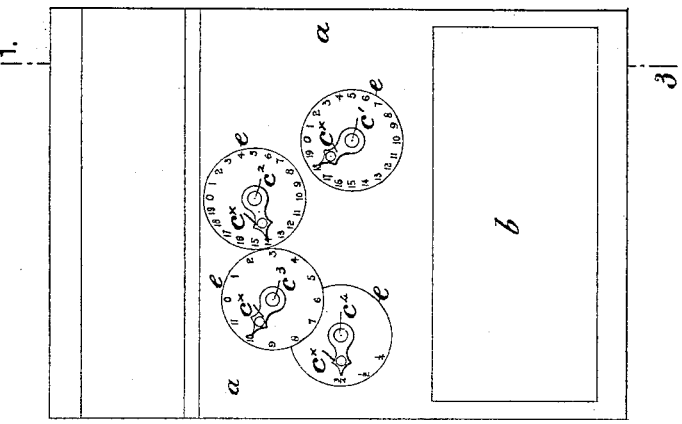
Witnesses. Inventor.

(No Model.) 5 Sheets—Sheet 2.
A. J. LYON.
APPARATUS AND TILL FOR RECORDING AND REGISTERING THE AMOUNT OF MONEY RECEIVED.
No. 389,159. Patented Sept. 4, 1888.
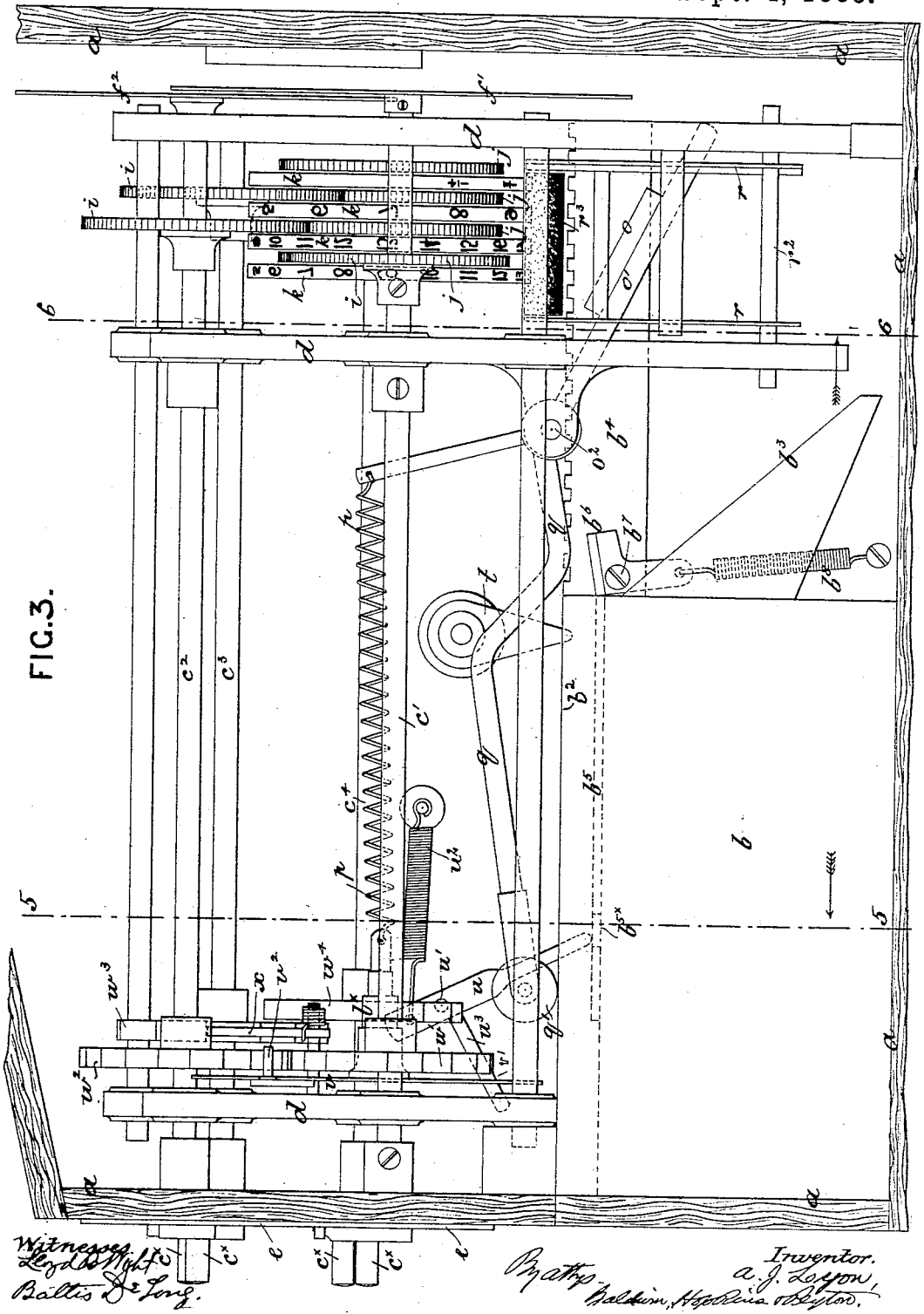

(No Model.) 5 Sheets—Sheet 3.
A. J. LYON.
APPARATUS AND TILL FOR RECORDING AND REGISTERING THE AMOUNT OF MONEY RECEIVED.

No. 389,159. Patented Sept. 4, 1888.

(No Model.) 5 Sheets—Sheet 4.

A. J. LYON.
APPARATUS AND TILL FOR RECORDING AND REGISTERING THE AMOUNT OF MONEY RECEIVED.

No. 389,159. Patented Sept. 4, 1888.

(No Model.) 5 Sheets—Sheet 5.
A. J. LYON.
APPARATUS AND TILL FOR RECORDING AND REGISTERING THE
AMOUNT OF MONEY RECEIVED.
No. 389,159. Patented Sept. 4, 1888.

Witnesses
Inventor.

UNITED STATES PATENT OFFICE.

ALGERNON JASPER LYON, OF CAMBRIDGE, COUNTY OF CAMBRIDGE, ASSIGNOR OF ONE-HALF TO GEORGE MOORE SAYLE, OF LONDON, ENGLAND.

APPARATUS AND TILL FOR RECORDING AND REGISTERING THE AMOUNT OF MONEY RECEIVED.

SPECIFICATION forming part of Letters Patent No. 389,159, dated September 4, 1888.

Application filed November 29, 1886. Serial No. 220,164. (No model.) Patented in England January 21, 1886, No. 947.

*To all whom it may concern:*

Be it known that I, ALGERNON JASPER LYON, a subject of the Queen of Great Britain, residing at 53 St. Andrews Street, Cambridge, in the county of Cambridge, England, solicitor, have invented an Improved Apparatus and Till for Indicating and Automatically Registering the Several Amounts of Money Received, (for which I have received Letters Patent in Great Britain, No. 947, dated January 21, 1886,) of which the following is a specification.

My invention relates to an improved apparatus and till which indicates to the payer and then automatically registers the several amounts of money received by shopmen, cashiers, or other persons, so that by comparing the total of the register with the amount of money in the till it can at any time be ascertained if theft has been committed, and, if so, what amount has been stolen.

This apparatus and till I prefer to construct as represented in the accompanying drawings, in which—

Figure 4:
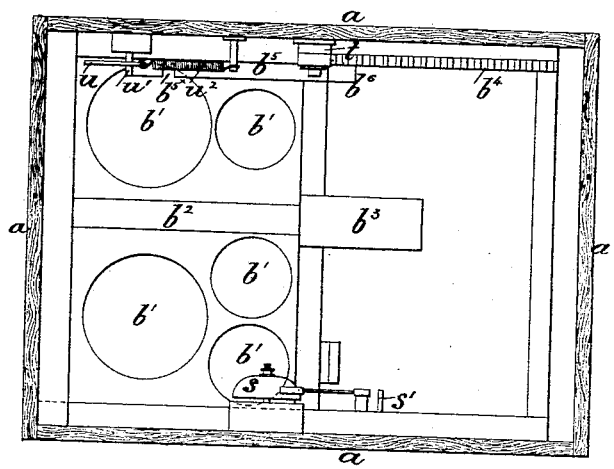
Figure 5:
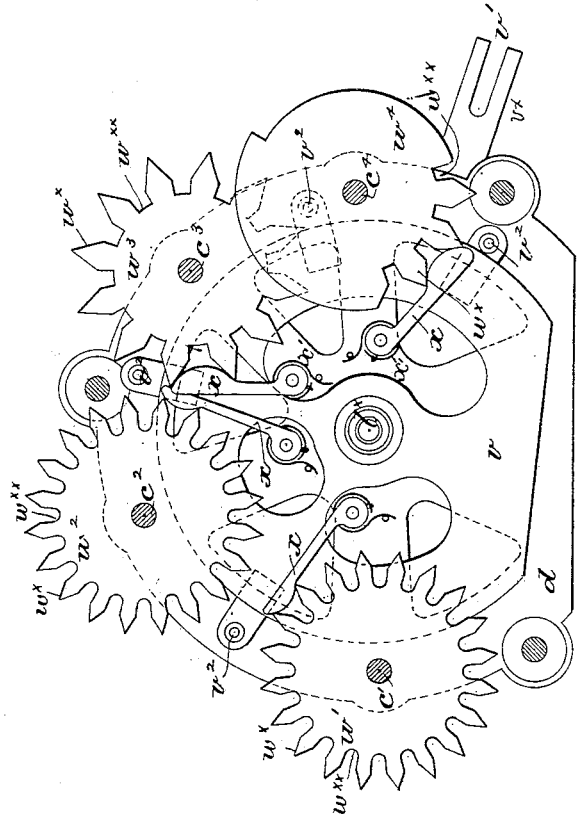
Figure 6:
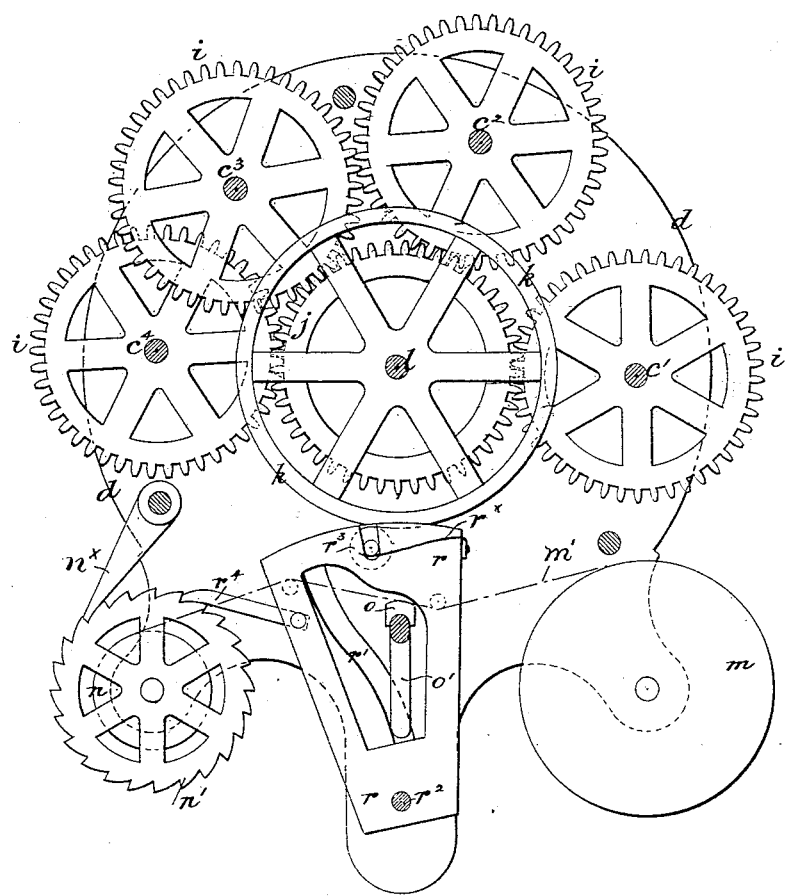

Figure 1 is an elevation of a till and apparatus constructed in accordance with my invention. The part here shown is that which faces the cashier. Fig. 2 is an elevation, the part shown being that which faces the payer or customer. Fig. 3 is a longitudinal section on the line 3 3 in Fig. 1. Fig. 4 is a sectional plan with some of the parts removed. Fig. 5 is a transverse section on the line 5 5 in Fig. 3, and looking from right to left in the direction of the arrow placed on this line. Fig. 6 is a transverse section on the line 6 6 in Fig. 3, and looking from left to right, as indicated by the arrow placed on the line.

$a\ a$ is the case of the apparatus. It is convenient to make it of desk-like form, and the mechanism is locked up within it.

$b$ is the till or drawer. It has a number of cavities, $b'\ b'$, in which the money is to be placed. This drawer can be opened and closed by the cashier at his pleasure; but whenever it opens it operates the recording mechanism.

$c'\ c^2\ c^3\ c^4$ are spindles carried in bearings in a suitable frame-work, $d$, and projecting through at the front of the apparatus where the cashier is posted. Here, also, each axis carries a regulator or index-finger, $c^*$. It is intended that the cashier, before opening the drawer of the till, should set these index-fingers to the figures upon the dials $e\ e\ e\ e$ in such manner as to indicate the sum in pounds, shillings, pence, and farthings which is paid to him by a purchaser, and which should be deposited in the till. The spindles $c'\ c^2\ c^3\ c^4$ at their farther ends carry serrated disks $f'\ f^2\ f^3\ f^4$, on which figures are written.

$g$ is a glass window at the back of the case, and behind this window there is a shield-plate, in which is a slit, $h$, and some of the figures upon the disks $f'\ f^2\ f^3\ f^4$ can be seen through this slit by the payer or customer who is paying the cashier. The figures so seen through the slit $h$ will correspond to those on the dials, to which the index-fingers $c^*$ have been placed by the cashier. It will be seen that the step-like notches in the edges of the serrated disks are so formed that a line of figures carried in part by each disk may be exhibited at the window.

The spindles $c'\ c^2\ c^3\ c^4$ carry toothed wheels $i\ i\ i\ i$, and these gear with four other toothed wheels, $j\ j\ j\ j$, which are fast to corresponding rollers $k\ k$, which have printing-type engraved on their peripheries, and which are adapted to print figures indicating pounds, shillings, pence, and farthings. Each spindle by means of its wheel $i$ thus controls one of the type-rollers $k$, and it so places it that the figures which are directly under the axis $l$, on which all these type-rollers can turn freely, correspond with the figures to which the index-fingers $c^*$ point and to the figures which the corresponding disk brings into view through the slit $h$.

$m$ is a roller on which a long tape or paper is wound. The paper $m'$, Fig. 6, is drawn from the roller $m$, to be wound upon a second roller, $n$, and while it passes from the one roller to the other it is brought into contact with the type-rollers and is printed. There is a door in the side of the case, giving access to the paper-rolls.

$o$ is a printing-pad carried by a printing-lever, $o'$, which has its fulcrum at $o^2$. A spring, $p$, connected with this lever tends at all times to raise the pad $o$ up to the type-rollers and to bring the paper, which, as will be seen in Fig. 6, lies over the pad $o$, into contact with these rollers to be printed; but when the till-drawer is closed the printing-pad is kept away from the type-rollers by means of a lever-arm, $q$, also fixed upon the axis $o^2$. This lever carries a roller, $q'$, which is supported by a guide-course, $b^2$, upon the till-drawer. As shown in the drawings, the guide-course $b^2$ is simply the top of a partition dividing the drawer centrally, on which partition or course $b^2$ the roller $q'$ travels. When the till-drawer is opened, the roller passes along this course and down the incline $b^3$, so as to cause the printing-block $o$ to rise and rest against the paper and hold it in contact with the type-wheels, and the printing is then effected, and when the till-drawer is again closed the roller $q'$ passes up the incline $b^3$, and again onto the guide-track $b^2$. The lever $o'$, which carries the printing-pad, also projects through an inclined slotted hole, $r'$, (see Fig. 6,) in a rocking frame, $r$, (see Fig. 6,) and so the movement of the lever $o'$ causes the frame $r$ to rock about its axis at $r^2$.

$r^3$ is an inking-roller carried by the frame $r$ and pressed upward by light springs $r^x$. The lever $o'$, when it passes up along the slot $r'$, causes this inking-roller $r^3$ to pass over the type at the lower parts of the type-rollers, and then immediately afterward it brings up the paper into contact with these type and an impression is taken from them. All this takes place during the opening of the till-drawer. As it is closed the rocking frame $r$ returns to its original position, and then, by means of the pawl $r^4$ upon it engaging with a ratchet-wheel, $n'$, on the roller $n$, it gives motion to this roller and winds the paper forward, so that the next impression taken may be at a suitable distance from the preceding.

$n^x$ is a retaining-pawl engaging with the teeth of the ratchet-wheel.

$s$ is a bell, which, by the operation of an ordinary trigger-finger, $s'$, on the drawer, is caused to be struck as the till-drawer commences to open. This is to warn the person making the payment to look at the figures then presented opposite the slit $h$, and to see that they correspond accurately with the payment he has to make.

$t$, Fig. 4, is a stop-pawl turning on a center on the side of the case; it engages with the teeth of a rack, $b^4$, on the side of the till-drawer, so that when the cashier has commenced to open the drawer he cannot close it again until it has been fully opened and until the type-rollers have printed the paper in the manner already described. When the drawer is entirely open, the last of the teeth $b^4$ has passed the end of the stop-pawl $t$, so that the drawer then can freely close, the pawl swinging over to the other side, and during the closing of the drawer the stop-pawl operates in the reverse direction, so that after the closing has been commenced the drawer cannot be opened again until it has been completely closed, and the paper has consequently been moved forward, so that the impression upon it cannot be blurred by any subsequent impression.

$u$ is a lever, (see Fig. 8,) which is intended to prevent the type-wheels being shifted at improper times. It is mounted on a center at $u'$, and the spring $u^2$ tends constantly to draw its lower end forward; but this when the till-drawer is closed is prevented by the track $b^5$, fixed to the till-drawer, and which then supports the end of the finger.

$u^3$ is an arm upon the lever $u$, which enters a slot, $v'$, in the arm $v^x$ in a frame, $v$, (see Fig. 5,) which is able to rotate about a central axis, $l^x$. This frame carries projections, on which are pins $v^2 v^2$, Figs. 3 and 5, intended to engage with teeth on wheels $w' w^2 w^3 w^4$, fixed upon the spindles $c' c^2 c^3 c^4$. When the the lower end of the lever $u$ passes forward, as it does when the till opens, the slotted arm $v^x$ raises the pins $v^2$ and they enter between the teeth of the wheels. If the wheels are not already quite correctly in position, the pins bring them to such a position by operating against one or another of the inclined cam-like sides of the teeth $w^x$, extending from the point to the contracted locking-notch $w^{xx}$ near the root of the tooth. When each wheel is thus accurately set, it is locked by the pin $v^2$ sinking into the locking-notch, and then the wheels $w' w^2 w^3 w^4$, and consequently also the type-rollers $k$, cannot be moved until the pins $v^2$ are again withdrawn from the teeth of the wheels. When the till-drawer commences to open, the lower end of the lever $u$ passes down into the notch $b^{5*}$ in the track $b^5$, and during the further movement of the drawer the lever mounts upon this guide-track, but then inclined in the opposite direction, the lower end of the lever $u$ now being directed toward the cashier. By these movements the locking of the type-rollers is effected in the manner already described. The type-rollers continue locked in consequence of the lever being supported by the track $b^5$ until the drawer is fully opened and until the type-rollers have already printed upon the paper and recorded the position in which the type-rollers have been placed. When the till-drawer is fully open, the guide-track $b^5$ has passed beyond the lever $u$, and so, also, has a continuation, $b^6$, of the track $b^5$. This part $b^6$ is mounted on a joint, $b^7$, so as to be capable of a slight movement, and it is sustained by the spring $b^8$, which throws the end of the piece $b^6$ slightly upward, so that in the closing of the till-drawer the end catches the extremity of the lever $u$, and the lever, as the drawer closes, mounts upon the track $b^5$ in the position in which it is shown in Fig. 3. This reversal of the position of the lever $u$ removes the pins $v^2$ from the teeth of the wheels $w' w^2 w^3 w^4$, and the type-rollers may then be again set to record a fresh transaction.

$x\ x\ x\ x$ are pawls, which are held by springs $x'$ against the teeth of the wheels $w' w^2 w^3 w^4$.

They aid the cashier in setting the index-fingers or regulators to the correct positions, giving the wheels a tendency to rotate by steps of suitable lengths.

When the till-drawer is open, the cashier is free to give change from it; but there will be automatically recorded upon the paper figures corresponding to the positions of the type-wheels at the time when the till-drawer is opened, and, if in each case the payer sees that these figures accurately correspond with the payment he makes, no fraud is possible without detection.

Having now particularly described and ascertained the nature of my said invention and in what manner the same is to be performed, I declare that what I claim is—

1. The combination of the till, the spindles carried by the till-frame and adapted to be turned by the operator, the indicators and type-rollers rotating with said spindles, the locking parts for retaining the spindles, the paper-carrier, and the lever for moving the paper into contact with the type-rollers, substantially as and for the purpose set forth.

2. The combination of the frame, the spindles carried thereby and each projecting at one end therefrom, the wheels carried by the spindles and provided with pointed cam-like teeth having the locking-notches between them, the till-drawer, the lever $u$, its guide-track $b^5$ $b^{5\times}$ $b^6$ on the till-drawer, the movable frame $v$, and the locking-pins carried thereby, substantially as and for the purpose set forth.

3. The combination of the till-drawer, the guide-track $b^2$, and incline $b^3$, the lever $q$, operated by said incline and track, the spring connected with the lever, the type-rollers, and the printing-pad connected with the lever $q$ and actuated by it to bring the paper into contact with the type-rollers, substantially as and for the purpose set forth.

4. The combination of the till-drawer, the printing-lever $o'$, connections of the lever operated by the opening and closing of the till-drawer, the type-rollers, the printing-pad, the inking-roller, and the frame carrying the inking-roller and having the inclined slot, through which the printing-lever passes, substantially as and for the purpose set forth.

5. The combination of the till-casing, the till-drawer, the rack fixed to the drawer, and the automatically-reversible pawl pivoted to the side of the casing and engaging with the rack, whereby there is insured the completion of each opening and closing movement of the till-drawer, substantially as set forth.

6. The combination of the till-drawer, the index-fingers, the spindles on which they are mounted, the type-wheels operatively connected with the spindles, the printing-pad, connections between the drawer and the printing-pad for applying it to the rollers and withdrawing it therefrom, the inking-roller, means for applying it to and withdrawing it from the printing-rollers, the paper strip interposed between the printing-pad and the type-wheels, and the rollers on which the strip is mounted, substantially as set forth.

ALGERNON JASPER LYON.

Witnesses:
   HY. PEED BANHAM,
      *Sluice, Cambridge, Solicitor's Clerk.*
   GEORGE MATON,
      *Jeweler, Cambridge.*